Figure 1:
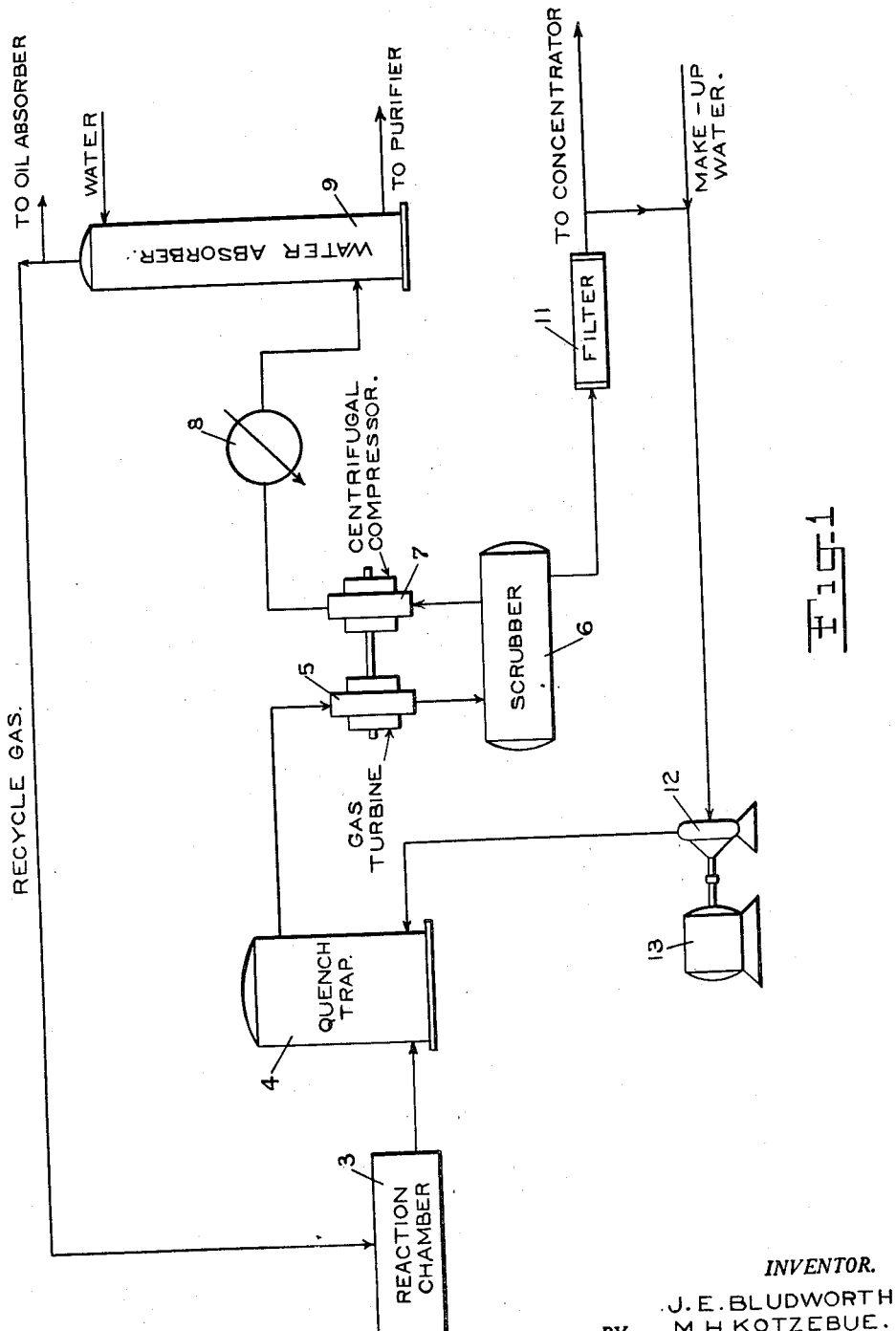

Feb. 21, 1950   J. E. BLUDWORTH ET AL   2,497,973
COOLING REACTION GASES
Filed Nov. 11, 1944   2 Sheets-Sheet 1

INVENTOR.
J. E. BLUDWORTH.
M. H. KOTZEBUE.
BY
ATTORNEYS.

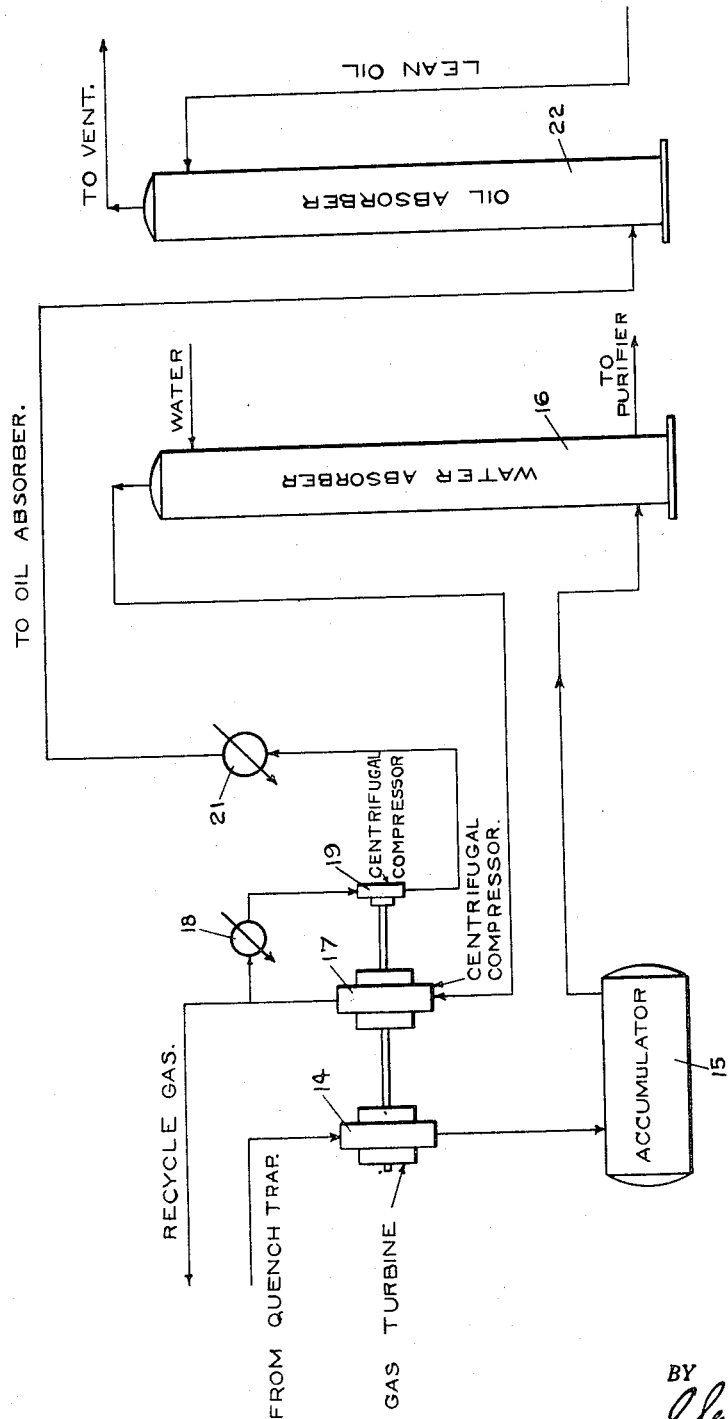

Patented Feb. 21, 1950

2,497,973

UNITED STATES PATENT OFFICE 2,497,973

COOLING REACTION GASES

Joseph E. Bludworth, Cumberland, Md., and Meinhard H. Kotzebue, Houston, Tex., assignors to Celanese Corporation of America, a corporation of Delaware Application November 11, 1944, Serial No. 563,054

3 Claims. (Cl. 260—451)

This invention relates to the manufacture of oxygenated organic compounds, and relates more particularly to a more efficient procedure for carrying out the manufacture of said products.

In Patents Nos. 2,128,908 and 2,128,909 to Joseph E. Bludworth, there are described processes for the oxidation of butane and other hydrocarbons in the presence of considerable quantities of a diluent such as steam, the main products of the processes being acetaldehyde, formaldehyde, acetone, acetic and other organic acids, with smaller proportions of methyl, propyl and butyl alcohols. In these processes, there is employed a large amount of heat in order to preheat the gases, hydrocarbons and air, to the reaction point. After the gases enter the reaction chamber, further heat is generated due to the reaction between the air and the hydrocarbon. The gases, upon leaving the reaction chamber are cooled, by the use of a quench and control coolers, to a temperature, at which most of the water of reaction, as well as the water of the quench, is precipitated.

Many attempts have been made to recover and utilize the energy available at the outlet of the reaction chamber. For example heat exchangers and other standard types of economizers were employed to recover the energy. However, these devices were not suitable since they failed to give the rapid cooling of the gases necessary for the efficient and satisfactory production of the oxygenated compounds desired, such as is effected by the use of a direct quench. Other difficulties attendant upon the use of such economizers are that they quickly become fouled with resins and they must be made of stainless steel.

It is, accordingly, an important object of this invention to provide a novel and efficient method of recovering and utiliziing the energy available in the process of producing oxygenated organic compounds from butane and other hydrocarbons.

According to one aspect of the present invention, the reaction gases from the reaction chamber are quenched with water reducing the temperature of the gases to a temperature which, under the conditions of pressure obtaining, is above the dew point of water. The gases are then passed through a turbine where the pressure is allowed to drop thus effecting an appreciable reduction in temperature of the gases and developing a substantial amount of power. The gases leaving the turbine are at such a temperature and pressure that the quench water is largely condensed. This water is collected in an accumulator or scrubber connected to the turbine, leaving only the reaction gases to be treated for the removal of the products of the reaction. The reaction gases pass out of the scrubber into a centrifugal gas compressor and thence to a water absorber where the oxygenated compounds are removed. The heat of compression causes the discharge temperature to rise and this heat of compression is taken out by means of a cooler between the compressor and the absorber. The unreacted gases are recycled to the reaction zone. The gases leave the compressor at such a pressure that recycle compressors are not necessary.

In another aspect of our invention, the centrifugal compressor is placed on the discharge side of the water absorber, the arrangement being such that it would eliminate the necessity of having the centrifugal gas compressor made of stainless steel. In this arrangement, however, the water absorber would be of larger capacity, but it would also cause the gases to enter this centrifugal compressor at a lower temperature and at a reduced volume.

The accompanying drawings show diagrammatically two forms of apparatus for carrying out our invention, Figure 1 shows an arrangement wherein the centrifugal gas compressor is placed before the water absorber, and Figure 2 shows an arrangement wherein the centrifugal gas compressor is on the discharge side of the water absorber.

Referring to Figure 1 of the drawings, reference numeral 3 indicates a reaction chamber in which butane or other hydrocarbon, or a mixture of butane and one or more other hydrocarbons, is reacted with air in the presence of an inert diluent such as steam. The reaction gases leave the reaction chamber at a temperature of 900° F. and a pressure of 100 pounds gauge pressure and are passed to a quench trap 4 to which water is added to reduce the temperature of the reaction gases as quickly as possible. Only sufficient water is added, however, to reduce the temperature of the reaction gases from 900° F. to 400° F., thus keeping the temperature above the dew point of water.

The reaction gases are then passed through a turbine 5 where the pressure is droped from 100 pounds gauge pressure to approximately 58 pounds gauge pressure. This drop in pressure causes the temperature of the reaction gases to fall from 400° F. to approximately 140° F. The cooling effect in the turbine 5 is comparable to the cooling effect produced by the stainless steel control coolers heretofore employed in processes of like nature. Passing the reaction gases through turbine 5 not only effects a cooling but also develops power which is utilized, at least in part, in the instant process of producing oxygenated organic compounds from butane and other hydrocarbons, as will hereinafter be set forth.

At the temperature of 140° F. and the pressure 58 pounds gauge, the quench water present in the reaction gases is largely condensed and deposited in a scrubber 6 which follows the turbine 5. This leaves only the reaction gases to be treated for the removal of the products of the reaction.

The reaction gases are passed from scrubber 6 to a centrifugal gas compressor 7 of stainless steel or other material inert to the reaction gases, which compresses the reaction gases to 125 pounds gauge. The heat of compression causes the reaction gases to rise to 315° F. This heat of compression is taken out by passing the compressed reaction gases through a cooler 8 before entering said gases into a water absorber 9 for the removal of the oxygenated compounds.

The gases leaving the water absorber 9 are divided, a portion being recycled to the reaction zone and a portion, including the nitrogen entering the reaction zone from the air, being passed to an oil absorber as will be more fully described in connection with the arrangement shown in Figure 2.

As indicated above, the water absorber 9 is operated at a pressure of 125 pounds gauge. Accordingly, the present arrangement obviates the use of recycle gas compressors heretofore found necessary in processes of like nature to recycle unreacted gases to the reaction zone.

In Figure 2, the reaction gases coming from the quench trap at a temperature of 400° F. and a pressure of 100 pounds gauge pressure are passed through gas turbine 14 where, as in the arrangement shown in Figure 1, the pressure is dropped from 100 pounds gauge pressure to 58 pounds gauge pressure and the temperature falls from 400° F. to approximately 140° F. Here also is produced not only a cooling effect but a development of power to be utilized in the instant process.

The condensate produced is collected in an accumulator 15, leaving only the reaction gases to be treated for the removal of the products of the reaction. The reaction gases, at a temperature of approximately 140° F. and a pressure of 58 pounds gauge pressure, are passed directly from the accumulator 15 to water absorber 16 for the removal of the oxygenated compounds. After passing through the water absorber 16, the gases, which are now at a temperature of approximately 100° F. and at a pressure of 58 pounds gauge pressure, are passed to a centrifugal gas compressor 17 powered by the turbine 14 and are compressed to 125 pounds gauge pressure. A portion of the gases, including nitrogen entering the reaction zone from the air, is passed through a cooler 18 and then through a second centrifugal gas compressor 19, also powered by the gas turbine 14. Compressor 19 raises the pressure of the gases to 275 pounds gauge pressure and causes an increase in the temperature of the gases. Accordingly, there is provided another cooler 21 which lowers the temperature of the compressed gases before they are passed to an oil absorber 22 which removes all of the hydrocarbon vapors present in the gases to the vent. The remainder of the gases from compressor 17 at 125 pounds gauge pressure are recycled to the reaction zone. By placing gas compressor on the discharge side of the water absorber, it is not necessary to have the same made of stainless steel, thus effecting a saving in the cost thereof.

The following example is given to illustrate the efficiency of the arrangement of process steps and apparatus of the instant invention.

Example

In a 27-ton unit for the oxidation of butane and other hydrocarbons, the amount of energy available in the exit reaction gases is theoretically approximately 20,000 horse power. However, the efficiency of the gas turbine (turbines 5 and 14) employed has been taken at 50%, the normal efficiency of turbines of this type. Accordingly, the turbine will have actually available 10,000 horse power.

The centrifugal gas compressor requires approximately 5,000 horse power to operate leaving 5,000 horse power available for other duties in connection with the present process. A 27-ton unit requires the following compression horse power: 2,400 horse power for compressing air and 800 horse power for boosting, making a total of 3,200 horse power. Therefore, the 5,000 horse power available after the compression of the gases would be approximately 40% more than that required.

It is to be understood that the foregoing detailed description is merely given by way of illustration and that many variations may be made therein without departing from the spirit of our invention.

Having described our invention, what we desire to secure by Letters Patent is:

1. In a process for the partial oxidation of hydrocarbons to produce oxygenated organic products wherein gaseous reaction products are obtained and recovered for commercial use, the steps of quenching the reaction gases with water to reduce the temperature of the gases to a temperature above the dew point of water, passing the quenched gases to a power generating unit so as to cause power to be generated, the gases to be cooled and substantially all of the quench water to be condensed, separating the condensed quench water from the reaction gases, and treating the reaction gases to separate the products of the reaction.

2. In a process for the partial oxidation of hydrocarbons to produce oxygenated organic products wherein gaseous reaction products are obtained and recovered for commercial use, the steps of quenching the reaction gases with water to reduce the temperature of said reaction gases to 400° F., passing the quenched gases to a power generating unit so as to cause power to be generated, the reaction gases to be cooled to a temperature of 140° F. and substantially all of the quench water to be condensed, separating the condensed quench water from the reaction gases, and treating the reaction gases to remove the oxygenated compounds.

3. In a process for the partial oxidation of hydrocarbons to produce oxygenated organic products wherein gaseous reaction products are obtained and recovered for commercial use, the steps of quenching the reaction gases with water to reduce the temperature of said reaction gases to 400° F., passing the quenched gases to a power generating unit so as to cause power to be generated, the reaction gases to be cooled to a temperature of 140° F. and substantially all of the quench water to be condensed, separating the condensed quench water from the reaction gases, compressing the water-free reaction gases by the use of the power generated by said quenched reaction gases, and treating the reaction gases to remove the oxygenated compounds.

JOSEPH E. BLUDWORTH.
MEINHARD H. KOTZEBUE.

REFERENCES CITED

The following references are of record in the file of this patent:

UNITED STATES PATENTS

| Number | Name | Date |
|---|---|---|
| 1,873,538 | Brown et al. | Aug. 23, 1932 |
| 1,939,018 | Odell | Dec. 12, 1933 |
| 1,988,456 | Lysholm | Jan. 22, 1935 |
| 2,078,956 | Lysholm | May 4, 1937 |
| 2,128,908 | Bludworth | Sept. 6, 1938 |
| 2,128,909 | Bludworth | Sept. 6, 1938 |
| 2,339,846 | Eastman et al. | Jan. 25, 1944 |
| 2,423,527 | Steinschlaeger | July 8, 1947 |